United States Patent [19]

Hamil

[11] 4,138,927
[45] Feb. 13, 1979

[54] INTERNAL GROOVING MACHINE

[76] Inventor: Ira B. Hamil, 3301 W. County Rd., Odessa, Tex. 79762

[21] Appl. No.: 783,852

[22] Filed: Apr. 1, 1977

[51] Int. Cl.² .......................... B23D 1/30; B23D 3/06
[52] U.S. Cl. ..................................... 90/24.3; 90/28.1; 82/DIG. 3
[58] Field of Search ................... 90/24.3, 28.1, 29, 41; 82/DIG. 3

[56] References Cited

U.S. PATENT DOCUMENTS

| 872,036 | 11/1907 | Wattie | 90/24.3 |
|---|---|---|---|
| 1,423,266 | 7/1922 | Sears | 90/41 |
| 2,082,212 | 6/1937 | Nickles | 90/24.3 |
| 2,318,155 | 5/1943 | Groene et al. | 90/28.1 |
| 2,382,302 | 8/1945 | End | 90/28.1 |

Primary Examiner—Leonidas Vlachos
Attorney, Agent, or Firm—Clarence A. O'Brien; Harvey B. Jacobson

[57] ABSTRACT

An internal grooving machine having a work holder arranged for supporting a workpiece on a frame adjacent a cutter arrangement which includes a ram assembly employing a grooved ram mounted for reciprocating movement relative to the workpiece in order to form one or more helical grooves on the workpiece. When a hollow bushing is used as the workpiece, internal grooves are cut so as to form lubricant grooves within the bushing and more equally distribute lubricant to a bearing assembly in which the bushing is employed.

2 Claims, 6 Drawing Figures

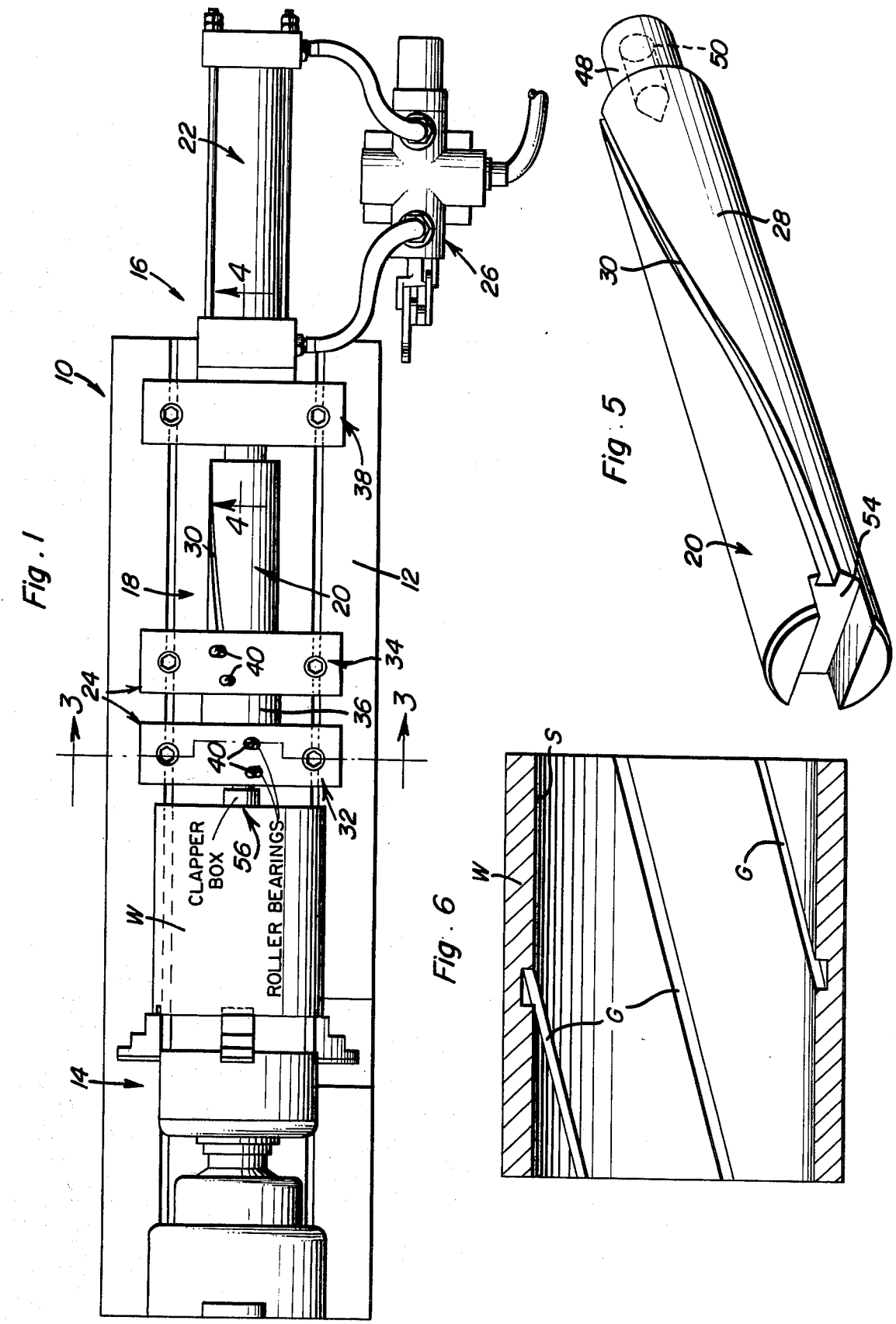

U.S. Patent  Feb. 13, 1979  Sheet 2 of 2  4,138,927
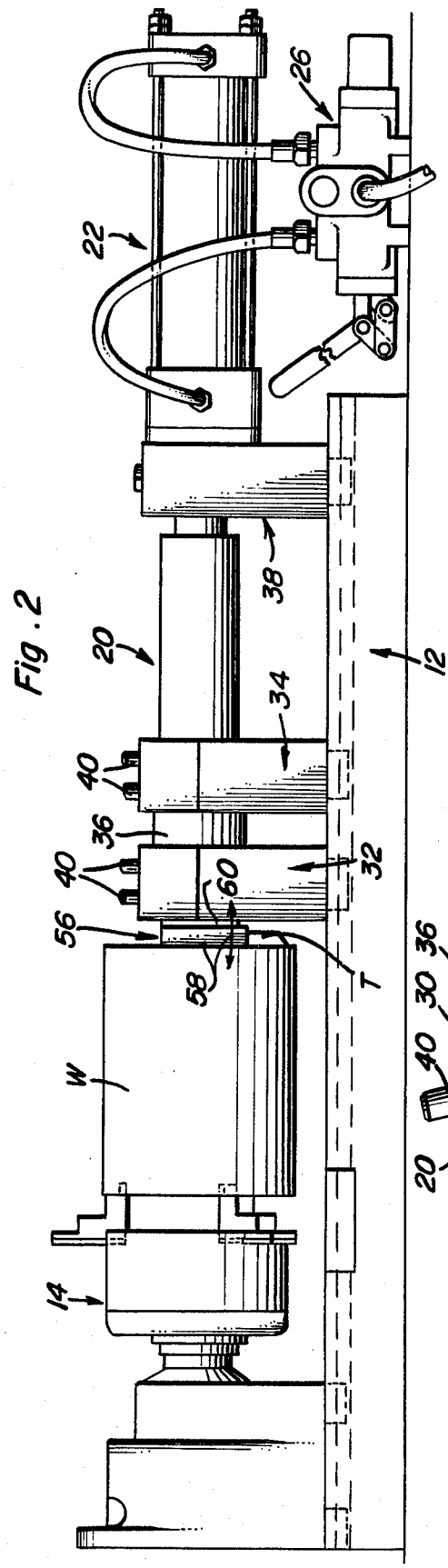
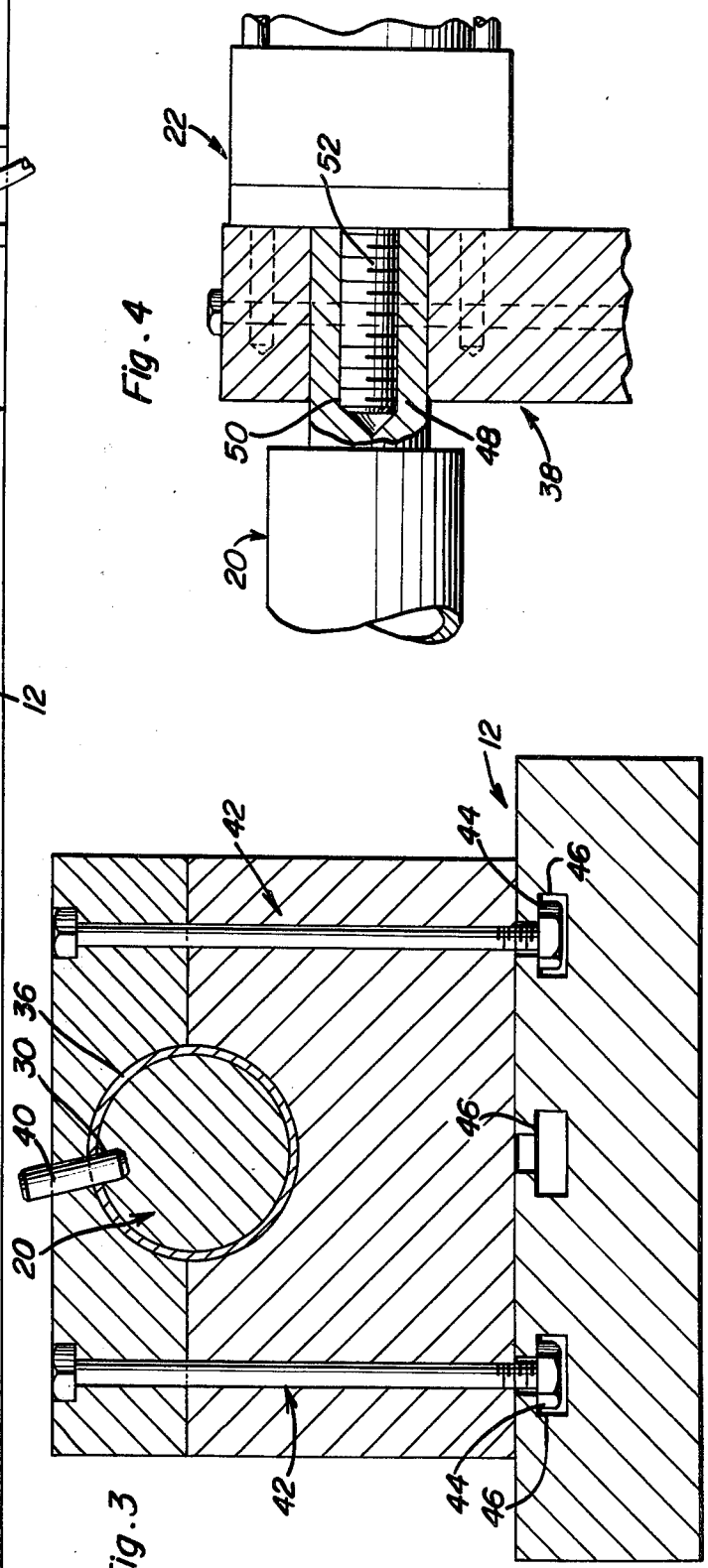

INTERNAL GROOVING MACHINE

BACKGROUND OF THE INVENTION

1. Field of the Invention

This invention relates generally to cutting machines, and particularly to a machine for forming grooves on the internal surface of bronze bushings, and the like, in order to form oil grooves which will more equally distribute a lubricant to the surface areas of a complete bearing and journal assembly.

2. Description of the Prior Art

It is desirable that the maximum oil supply should be directed to the load carrying area of a bushing associated with a bearing assembly. Due to such variables as speed, load, and direction of rotation of the journal, the pressure point of the load on the bushing fluctuates. To compensate for these variables, helical oil grooves, equally spaced about the inside surface of the bushing, will most adequately supply the necessary lubrication to the load point.

These grooves also serve to entrap foreign particles in the oil and return them to the oil reservoir, rather than let the particles rotate with the journal and score the surface of the journal.

U.S. Pat. No. 1,504,133, issued Aug. 5, 1924, to O. W. Mueller, discloses a grooving attachment for lathes and similar machines wherein crossing grooves are formed in an appropriate portion of a shaft which is to receive a lubricant. Further, it is well known to provide grooves in the inner surface of bearings, and the like, as exemplified in U.S. Pat. Nos: 1,343,554, issued June 15, 1920, to W. F. Fischer; No. 1,658,470, issued Feb. 7, 1928, to R. F. Watson; No. 2,157,484, issued May 9, 1939, to A. F. Fischer; and No. 2,524,910, issued Oct. 10, 1950, to O. L. Hopper. These known groove cutters generally employ a rotating cutting element guided appropriately relative to the workpiece by a suitable cam arrangement.

SUMMARY OF THE INVENTION

It is an object of the present invention to provide a grooving machine of simple construction which is capable of placing a helical groove on an inner surface of a bushing in a consistent manner.

It is another object of the present invention to provide a grooving machine having a simple, but rugged and reliable, mechanism for tracing a helical groove on the inner surface of a bushing, and the like.

These and other objects are achieved according to the present invention by providing an internal grooving machine having: a frame; a work holder assembly mounted on the frame for supporting a workpiece; and a cutter arrangement mounted on the frame for forming a groove on the workpiece. The latter is preferably a hollow cylinder having an inner surface, with the cutter arrangement including a cutting tool disposed against the inner surface of the cylinder in order to form a groove or grooves in such inner surface.

The cutter arrangement advantageously includes a ram mounted on the frame of the machine for reciprocating movement toward and away from the work holder, and acccordingly the workpiece, with this ram supporting a cutting tool adjacent to, or actually within, the workpiece. A support arrangement is mounted on the frame as well so as to reciprocatingly support the ram and for rotating the ram during such reciprocating movement thereof. The ram, or ram assembly, includes a ram member and a linear motor, such as a suitable piston and cylinder fluid motor, connected to the ram member for selectively reciprocating the latter relative to the ram support arrangement. The ram member preferably has a substantially cylindrical surface provided with a helical groove, configured to the groove desired to be formed on the workpiece, and the support arrangement has mounted thereon pins advantageously in the form of roller bearings which engage in the groove for causing rotation of the ram member during reciprocating movement thereof.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a partly schematic, top plan view showing a grooving machine according to the present invention.

FIG. 2 is a partly schematic, side elevational view, showing the arrangement of FIG. 1.

FIG. 3 is an enlarged, sectional view taken generally along the line 3—3 of FIG. 1.

FIG. 4 is an enlarged, fragmentary, sectional view taken generally along the line 4—4 of FIG. 1.

FIG. 5 is a perspective view showing a ram member according to the present invention.

FIG. 6 is a vertical, longitudinal, sectional view taken through a workpiece formed with grooves according to the present invention.

DESCRIPTION OF THE PREFERRED EMBODIMENTS

Referring now more particularly to the figures of the drawings, a grooving machine 10 according to the present invention includes a bed or frame 12 in the form of a generally rectangular block on which is mounted a work holder assembly 14 arranged for supporting a workpiece W. As can be readily seen from FIGS. 1 and 2, work holder assembly 14 includes a conventional chuck, and the like, rotatably mounted on an indexing head, and the like, so as to permit the specific area of the surface of a workpiece W to be grooved to be positioned appropriately relative to a tool bit T mounted on a cutter arrangement 16 also mounted on frame 12.

Cutter arrangement 16 includes a ram assembly 18 mounted on frame 12 for reciprocating movement relative thereto, and to the workpiece W. The tool bit T is supported on the outer, or free end of a ram member 20 including in ram assembly 18 such that the tool bit T is disposed adjacent workpiece W. Ram assembly 18 also includes a linear motor 22 of conventional construction, such as the illustrated piston and cylinder fluid actuated motor, connected to ram member 20 for selectively reciprocating ram member 20 relative to frame 12. Both ram member 20 and motor 22 are mounted on a ram support arrangement 24 such that ram member 20 will rotate relative to support arrangement 24 during reciprocating movement of member 20.

A conventional spool valve 26 is connected to motor 22 for facilitating actuation of same in a known manner. Since the construction and operation of motor 22 and valve 26 is well known and similar to fluid motors commonly employed, the construction of these elements will not be described in detail herein.

Ram member 20 has a substantially cylindrical outer surface 28 in which is provided a helical groove 30. Pins, to be described below, mounted on support arrangement 24 are arranged so as to slidably engage in groove 30 and cause rotation of ram member 20 during reciprocating movement of the ram member.

Ram member 20 is journaled in a pair of pedestals 32 and 34 of typical construction and having interposed therein between the openings provided in the pedestals 32, 34 and the ram member 20 itself a suitable sleeve 36 which acts as a bushing. Also included in support arrangement 24 and mounted on frame 12 so as to extend upwardly therefrom is a stand 38 on which motor 22 is mounted as by the illustrated bolts. Finally, support arrangement 24 includes a plurality of roller bearings 40 which form the pins referred to above and which engage in groove 30 provided in the surface 28 of ram member 20 in order to cause the ram member 20 to rotate appropriately or along a helix, during reciprocating movement of ram member 20. It will be appreciated that pedestals 32, 34 and sleeve 36 form a bearing which functions to support ram member 20 for both sliding and rotational movement.

The two sections of each pedestal 32, 34 are connected together by the illustrated bolts 42 extending downwardly through the pedestal sections and having conventional nuts 44 threadedly engaged on the screw threaded lower end portions of the bolts 42. Tracks 46 in the form of slots in inverted T-shape receive the screw threaded end portions of bolts 42 and the nuts 44 for permitting pedestals 32 and 34 to be appropriately positioned along the longitudinal extent of the frame 12. More specifically, by extending the tracks 46 along the longitudinal extent of frame 12, exact placement of pedestals 32 and 34 can be achieved as necessary for a particular grooving operation. Stand 38 is also mounted on frame 12 in a manner similar to that mounting pedestals 32 and 34 in order to permit appropriate adjustment of stand 38.

Ram member 20 is provided at one longitudinal end with a neck 48 of reduced diameter and having formed therein a screw threaded bore 50 arranged extending axially of the cylindrical member 20 and which threadedly engages with a stud 52 for connecting ram member 20 to motor 22. At the other longitudinal end of ram member 20 is provided a slot 54 which partially receives a clapper box tool holder 56 on which tool bit T is disposed. By employing a clapper box arrangement for tool holder 56, it will be appreciated that contact of clapper 58 against stop 60 results in tool bit T cutting into a workpiece W only on the forward stroke, that being to the left in FIGS. 1 and 2 of ram member 20.

In operation, ram member 20, which is advantageously constructed from a solid bar of steel, and the like, with a precision machine helical groove 30, is guided longitudinally by the roller bearings 40 engaging helical groove 30 so as to have imparted thereto a rotation that results in a helical path for the tool bit T through the bushing forming workpiece W. While a lead of 60 inches per revolution for groove 30 has been found satisfactory for some purposes, other ram members with different leads for groove 30 may be interchanged to produce oil grooves of different configurations. The length of the stroke of ram member 20 can be controlled by adjustable microswitches (not shown) that actuate the solenoid operated directional control valve 26. As mentioned above, the clapper box tool holder 56 allows for cutting of workpiece W on the forward stroke of ram member 20, and tool relief from the workpiece W on the return stroke. Motor 22 and its associated parts of support arrangement 24 are designed to assure proper alignment to the axis of frame 12, ram member 20 and work holder assembly 14. This motor 22 is called, for example, a commercially available hydraulic unit of sufficient diameter in length of stroke to accommodate the length of a workpiece W to be grooved, and is connected to a suitable hydraulic power supply (not shown), and the like, through the directional control valve and flow control device represented by valve 26 by appropriate high pressure hydraulic hose of conventional construction.

By appropriate indexing of work holder assembly 14 in a conventional manner, a plurality of grooves G as shown in FIG. 6 of the drawings can be formed on the inner surface of a bushing being used as the workpiece W.

As can be readily understood from the above description and from the drawings, a grooving machine according to the present invention permits formation of internal grooves in bushings and similar sleeve-like elements in a simple and consistent manner so as to quickly and easily form appropriate oil grooves in the interior of bushings intended to be used in lubricated bearing and journal assemblies.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A grooving machine, comprising, in combination:
   (a) a frame;
   (b) work holder means mounted on the frame for supporting a workpiece; and
   (c) cutter means mounted on the frame for forming a groove on the workpiece, the cutter means including, in combination:
   (1) ram means mounted on the frame for reciprocating movement relative to the work holder means and supporting a cutting tool for engagement with the workpiece; and
   (2) ram support means mounted on the frame and reciprocatingly supporting the ram means for rotating the ram means during reciprocating movement of the ram means, the ram means including a ram member and a linear motor connected to the ram member, the motor being arranged for selectively reciprocating the ram member relative to the ram support means, and the ram member having a substantially cylindrical surface provided with a helical groove, with rotatable pin means being included in the ram support means for engaging in the groove and causing rotation of the ram member during reciprocating movement of the ram member, the ram support means including two coaxially disposed pedestals arranged for receiving the ram member, and a stand arranged for supporting the linear motor, the motor mounted on the stand coaxial with and connected to the ram member for selectively reciprocating same, the pin means including roller bearings mounted on the pedestals, each of the pedestals being provided with at least one of the roller bearings, the roller bearings being arranged for engaging the groove provided in the ram member.

2. A structure as defined in claim 1, wherein the workpiece is a hollow cylinder having an inner surface, and with the cutter means including a clapper box tool holder arranged for supporting a cutting tool against the inner surface of the cylinder for cutting the cylinder in one direction of movement of the ram member and providing relief for the inner surface of the cylinder during a reverse direction of movement of the ram member.

* * * * *